(12) United States Patent
Schwedt et al.

(10) Patent No.: US 12,298,488 B2
(45) Date of Patent: May 13, 2025

(54) DEVICE AND METHOD FOR MULTI-SPOT SCANNING MICROSCOPY

(71) Applicant: Carl Zeiss Microscopy GmbH, Jena (DE)

(72) Inventors: Daniel Schwedt, Jena (DE); Tiemo Anhut, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 511 days.

(21) Appl. No.: 17/719,047

(22) Filed: Apr. 12, 2022

(65) Prior Publication Data

US 2022/0326493 A1 Oct. 13, 2022

(30) Foreign Application Priority Data

Apr. 13, 2021 (DE) .................. 10-2021-203620.1

(51) Int. Cl.
*G02B 21/00* (2006.01)
*G01N 21/64* (2006.01)

(52) U.S. Cl.
CPC ..... *G02B 21/0032* (2013.01); *G01N 21/6458* (2013.01); *G02B 21/0076* (2013.01)

(58) Field of Classification Search
CPC ........... G02B 21/0032; G02B 21/0076; G02B 21/00; G02B 21/0004; G02B 21/002; G02B 21/0024; G02B 21/0036; G02B 21/004; G02B 21/0052; G02B 21/0064; G02B 21/0068; G02B 21/008; G02B 21/0092;

(Continued)

(56) References Cited

U.S. PATENT DOCUMENTS

| 10,502,940 B2 * | 12/2019 | Bathe .................. G02B 21/006 |
| 2002/0097485 A1 | 7/2002 | Aoshima |
| 2018/0052099 A1 * | 2/2018 | Hill ...................... G01J 3/0213 |

FOREIGN PATENT DOCUMENTS

| DE | 10-2013-022026 | 6/2015 |
| DE | 102013022026 A1 | 6/2015 |

(Continued)

OTHER PUBLICATIONS

German Search Report for Application No. 10 2021 203 620.1, mailed Nov. 2, 2021, (11 pages).

(Continued)

*Primary Examiner* — Arnel C Lavarias
(74) *Attorney, Agent, or Firm* — NIXON PEABODY LLP; Jeffrey L. Costellia

(57) ABSTRACT

A device and a method for multi-spot scanning microscopy using a segmented color separator are disclosed, wherein a beam splitter is segmented laterally to a surface normal of the beam splitter into at least two filter fields for the selection of wavelength ranges and/or polarization directions. Individual partial illumination beams are thus each guided in an illumination beam path into a light spot on or in a simple to be examined and scanned over it. Detection light, which the sample emits in partial detection means after irradiation using the individual partial illumination beams, is guided onto a detection unit and detected thereby, wherein the partial illumination beams and/or the partial detection beams are each selected according to wavelength ranges and/or polarization directions by means of the beam splitter segmented laterally to a surface normal.

10 Claims, 3 Drawing Sheets

(58) Field of Classification Search
CPC ...... G02B 21/06; G02B 21/36; G02B 21/361; G02B 21/365; G01N 21/6458; G01N 21/6456; G01N 2021/6463; G01N 21/6486
USPC ....... 359/368, 362, 363, 369, 385, 386, 388, 359/390
See application file for complete search history.

(56) References Cited

FOREIGN PATENT DOCUMENTS

| DE | 10-2014-008098 | 12/2015 |
|---|---|---|
| DE | 102014008098 A1 | 12/2015 |
| DE | 10-2016-102286 | 8/2017 |
| DE | 102016102286 A1 | 8/2017 |

OTHER PUBLICATIONS

German Search Report for Application No. 10 2021 203 620.1, mail Nov. 8, 2021 (21 pages).

* cited by examiner

DEVICE AND METHOD FOR MULTI-SPOT SCANNING MICROSCOPY

BACKGROUND OF THE INVENTION

(1) Field of the Invention

The invention relates to a device and a method for multi-spot scanning microscopy using a segmented color separator.

(2) Description of Related Art

A generic device for multi-spot scanning microscopy is described, for example, in WO-13 131 808 A1 and has the following components: a multicolor light source for providing at least one illumination light beam, a separating device for separating the illumination light beam into multiple partial illumination beams, first optical means for providing an illumination beam path for guiding and focusing each of the individual partial illumination beams into a light spot on or in a sample to be examined, a scanning unit for guiding the light spot over the sample, a detection unit for detecting detection light, which the sample emits in partial detection beams after irradiation using the individual partial illumination beams, second optical means for providing a detection beam path for guiding the partial detection beams onto the detector unit, and a control and evaluation unit for activating the scanning unit and for evaluating the detection light detected by the detection unit.

A generic method for multi-spot scanning microscopy is also disclosed in WO-13 131 808 A1. The following steps are carried out therein: At least one illumination light beam is provided using a multicolor light source, the illumination light beam is separated into multiple partial illumination beams, the individual partial illumination beams are each guided in an illumination beam path into a light spot on or in a sample to be examined and scanned over this sample, detection light, which the sample emits in partial detection beams after irradiation using the individual partial illumination beams, is guided onto a detector unit and detected thereby.

Laser scanning microscopy (LSM) is a high-performance tool in biomedical research on living and fixed cell samples, since it permits both fluorescence imaging and also measurement methods going beyond this (FLIM, FRAP, FRET, FCS, etc.). The trend of studying living samples as much as possible requires the use of the longest-wave possible fluorophores, for example, fluorescent proteins such as tdTomato or mCherry. Moreover, the number of wavelength ranges to be measured within an experiment is increasing.

However, fluorescent proteins or synthetic pigments may usually only be combined with one another inadequately using the laser scanning microscopes according to the prior art and at the same time excited in the most spectrally discriminated manner possible, since, on the one hand, the excitation spectra thereof strongly overlap and the spectral bandwidths of the beam splitters are in the range of 10 nm in the blue spectral range and up to 30 nm in the red spectral range. Beam splitters for spectrally closely adjacent wavelength ranges therefore still hardly offer a transmission window to the fluorescence of the proteins, in particular in the case of longer and longer wave excitation.

For example, the combined use of the fluorescent proteins tdTomato with an excitation wavelength of 561 nm and mCherry within excitation wavelength of 594 nm on a beam splitter (also main beam splitter. MBS) having a previously selected high reflectivity around 594 nm would block significant parts of the emission of tdTomato. Large parts of the emitted signal are thus blocked at the beam splitter.

To nonetheless be able to measure corresponding pigment combinations, up to this point, so-called multitrack experiments have been carried out. For the example just mentioned of the combined use of the fluorescent proteins tdTomato and mCherry, first a beam splitter having a high reflectivity at 561 nm is selected, the sample is excited at 561 nm, scanned, and the registered signal is stored in a first data channel. A beam splitter having high reflectivity at 594 nm would then be selected, the sample excited at 594 nm, the registered signal read in and stored in a second data channel. Multicolor imaging can be achieved in this way, but simultaneity of the data acquisition is not possible. The reconfiguration of the device in the multitrack experiment typically takes several seconds.

SUMMARY OF THE INVENTION

It can be considered to be an object of the present invention to specify a device and a method, with which the above-mentioned problems are substantially avoided. The object is achieved by a device and a method as disclosed below.

A device according to the invention refines the above-mentioned generic device in such a way that the first optical means and the second optical means have at least one beam splitter as common components, which is segmented laterally to a surface normal of the beam splitter into at least two filter fields for the selection of wavelength ranges and/or polarization directions.

The beam splitter is thus to be segmented—therefore subdivided—laterally to a surface normal in the region of the area on which the partial illumination beams are reflected in the direction of the sample to be examined or the partial detection beams are transmitted in the direction of the detection unit, so that in this case at least two filter fields result, by means of which the partial illumination beams or the partial detection beams are selected with respect to their wavelength ranges and/or polarization directions. This beam splitter can be viewed as the main beam splitter.

Selection is to be understood here to mean that the wavelength range(s) required for the examination of a sample and/or the polarization direction(s) of the partial illumination beams required for the examination of a sample, thus their desired spectral characteristics, is/are reflected by the beam splitter in the direction of the sample and wavelength ranges and/or polarization directions of the partial illumination beams deviating therefrom are transmitted at the beam splitter. Analogously, the partial detection beams, which the sample emits after the irradiation by the individual partial illumination beams, are to be transmitted or reflected, respectively, by the beam splitter.

The present invention improves the spectral excitation performance of a laser scanning microscope in such a way that two or more pigments can be excited optimally without having to accept additional losses at the beam splitter. In particular in the red wavelength range, a significant gain in efficiency is to be expected here. Furthermore, simultaneity of the data recording is achieved. The reconfiguration is omitted and the data acquisition is significantly accelerated.

The device for providing at least two partial illumination beams can provide them by means of multiple light sources and/or at least one multicolor light source, the illumination light beam of which is separated by means of a separating device into partial illumination beams. A filter device is arranged downstream to set a desired spectral characteristic of the at least two partial illumination beams.

A first preferred embodiment of the invention is provided if adjacent filter fields are formed to select wavelength ranges different from one another and/or polarization directions different from one another. Filter feeds which are arranged adjacent to one another in the broadest sense are to select different wavelength ranges and/or different polarization directions. Accordingly, if two or more partial illumination beams are provided and the beam splitter is positioned so that the light spots of the partial illumination beams are incident on different and in particular adjacent filter fields of the beam splitter, adjacent fluorophores and in particular closely adjacent fluorophores are excited. The number of excitable fluorophores for an image scan can thus be increased and/or the spectral difference, i.e., the difference of their wavelengths, of partial illumination beams in relation to one another can be significantly reduced. Moreover, it can be advantageous for the combinatorics on excitable pigments that the same filter characteristic is applied multiple times to the substrate of the beam splitter.

A next preferred embodiment provides that at least one of the filter fields is designed to select at least two wavelength ranges and/or at least two polarization directions. At least one of the filter fields can thus be designed in each case for a certain number of wavelengths or wavelength ranges. The at least one beam splitter can thus be reflective in a filter element only for one excitation wavelength or for an arbitrary number of different wavelengths. The same alternatively or additionally applies for polarization directions to be selected.

Preferably, at least one of the filter fields is formed by means of a dielectric filter layer system. A dielectric filter layer system has multiple layers stacked one on top of another, which are formed alternately from two different materials. The two different materials differ in particular in their indices of refraction, so that one of the materials can be designated as high-refractive (high index of refraction) and the other of the materials as low-refractive (low index of refraction). In such a layer system, the number of the layers and the layer thicknesses can be optimized easily by computer with respect to the existing requirements, preferably having high reflectivity in the vicinity of the selected layer lines and high transmission in the range of the fluorescence wavelengths.

In the device according to the invention, the filter device can be designed as a segmented AOTF. An AOTF (acousto-optic tunable filter) is an acousto-optic crystal, to which a piezo crystal (acoustic transducer) is coupled. AOTF are used to sort illumination light of different colors from the infrared to the ultraviolet range and to be able to set the spectral excitation properties of the excitation beams independently of one another.

Alternatively or additionally, the beam splitter for forming the at least two filter fields can be formed as an acousto-optic beam splitter (also called AOBS), having at least two acousto-optic crystals separate from one another or having one acousto-optic crystal and at least two piezo crystals. In the first alternative, a separate acousto-optic crystal is provided for each filter field, wherein the acousto-optic crystals are separate from one another. Each acousto-optic crystal is thus assigned only to exactly one filter field. In the second alternative, one acousto-optic crystal and at least two piezo crystals are provided, wherein the piezo crystals act on the acousto-optic crystal in such a way that at least two regions are formed which correspond to the at least two filter fields.

The first order, in which the illumination light of the plurality of partial illumination beams is diffracted on the AOBS, is thus passed on directly via the scanning mirror to the microscope objective. Florescent light emitted by the sample is not diffracted on the segmented AOBS due to the Stokes shift and propagates further along the zeroth order in the direction of the pinhole. Backscattered laser light is partially removed by diffraction at the AOBS from the fluorescence beam path. To optimize the scattered light suppression, an edge filter can additionally be introduced into the corresponding beam paths.

At least one of the filter fields can be formed as a neutral splitter. Such neutral splitters are used to set predefined R/T values (R as reflectance and T as transmittance), for example, with a splitting ratio 80/20, and are often used to obtain a reflection image of the sample.

It is very particularly preferred that the at least one beam splitter is displaceable laterally to a surface normal of the at least one beam splitter. It is possible by way of a lateral displacement of the at least one beam splitter to provide different spectral reflectivities to the partial illumination beam or beams. Therefore, for example, two wavelengths close to one another such as 561 nm and 594 nm, which would never be brought simultaneously onto the sample with one excitation spot, are divided onto two excitation spots and thus the two corresponding pigments may be examined simultaneously and detected with very high efficiency. The at least one beam splitter is preferably displaced in such a way that the partial illumination beams are incident on different and in particular adjacent filter fields.

The displacement can take place manually and/or automatically. It can be expedient that the control and evaluation unit is configured to activate a displacement of the at least one beam splitter. The control and evaluation unit activates a device which is designed to displace the at least one beam splitter in at least one direction lateral to its surface normal. This can be carried out by motor, for example. In particular the automated displacement of the at least one beam splitter activated by the control and evaluation unit permits a reproducible, rapid, and simple adjustment of the system by the positioning of the desired filter fields with respect to the partial illumination beams and/or the partial detection beams.

A further embodiment of the invention provides that the at least one beam splitter is inclined at an angle in relation to the optical axis of the beam path. This angle can preferably be approximately 100 or also 45°.

In a method according to the invention for multi-spot scanning microscopy using the above-explained device, at least two illumination light beams are provided using a device for providing partial illumination beams. The individual partial illumination beams are each guided in an illumination beam path into a light spot on or in a sample to be examined and scanned over it. Detection light, which the sample emits in partial detection beams after irradiation using the individual partial illumination beams, is guided onto a detection unit and detected thereby, wherein the partial illumination beams and/or the partial detection beams are each selected by means of the beam splitter, which is segmented laterally to a surface normal, according to wavelength ranges and/or polarization directions.

The different embodiments of the invention mentioned in this application are advantageously combinable with one another, if not stated otherwise in the individual case.

The invention is explained hereinafter in exemplary embodiments on the basis of the associated drawings. In the figures:

DETAILED DESCRIPTION OF THE INVENTION

Figure 1:
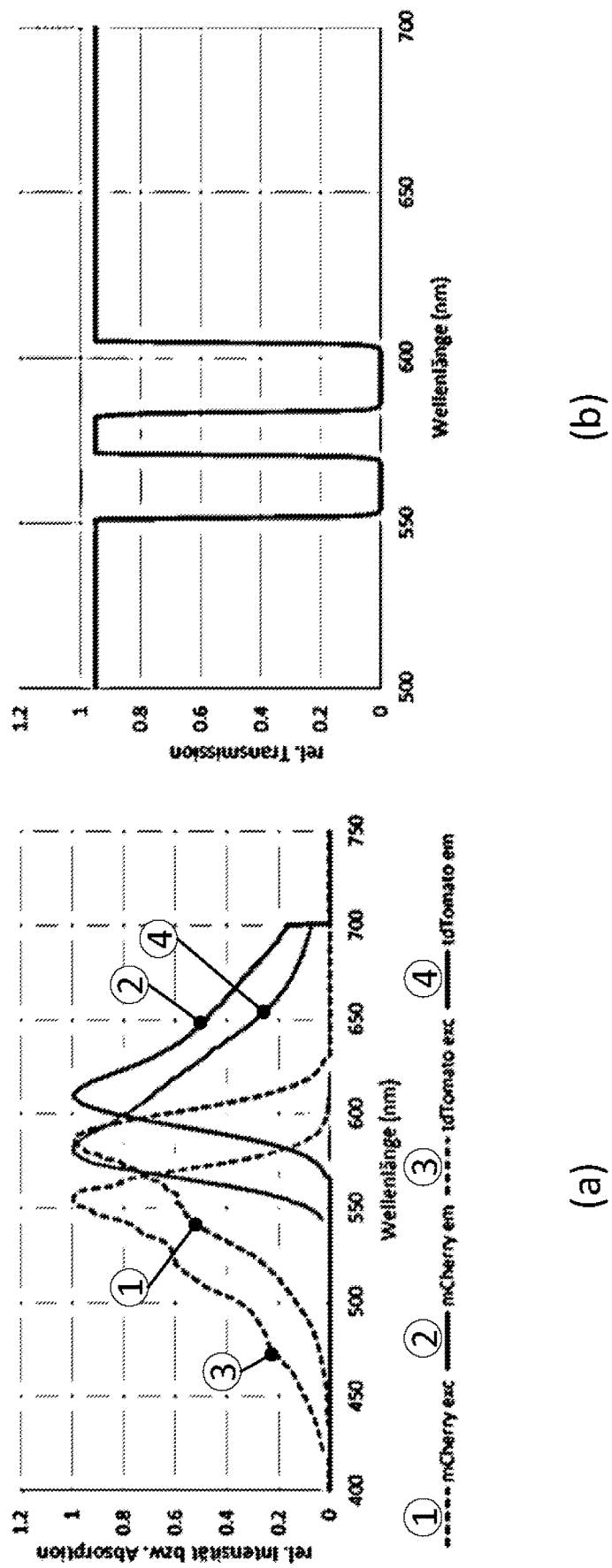
FIG. 1 shows various excitation and emission spectra upon the excitation of fluorescent proteins.

FIG. 1a shows the excitation spectra (dashed lines) and the emission spectra (solid lines) of the typical fluorescent proteins mCherry and tdTomato. Upon transmission of the emission light by a beam splitter having high reflectivity around 594 nm for mCherry, significant parts of the emission of tdTomato would be blocked and therefore large parts of the signal would be blocked at the beam splitter, because the excitation spectra of the two proteins are close to one another. FIG. 1b shows which transmission spectrum a beam splitter would have to have for optimum excitation of both proteins.

Figure 2:
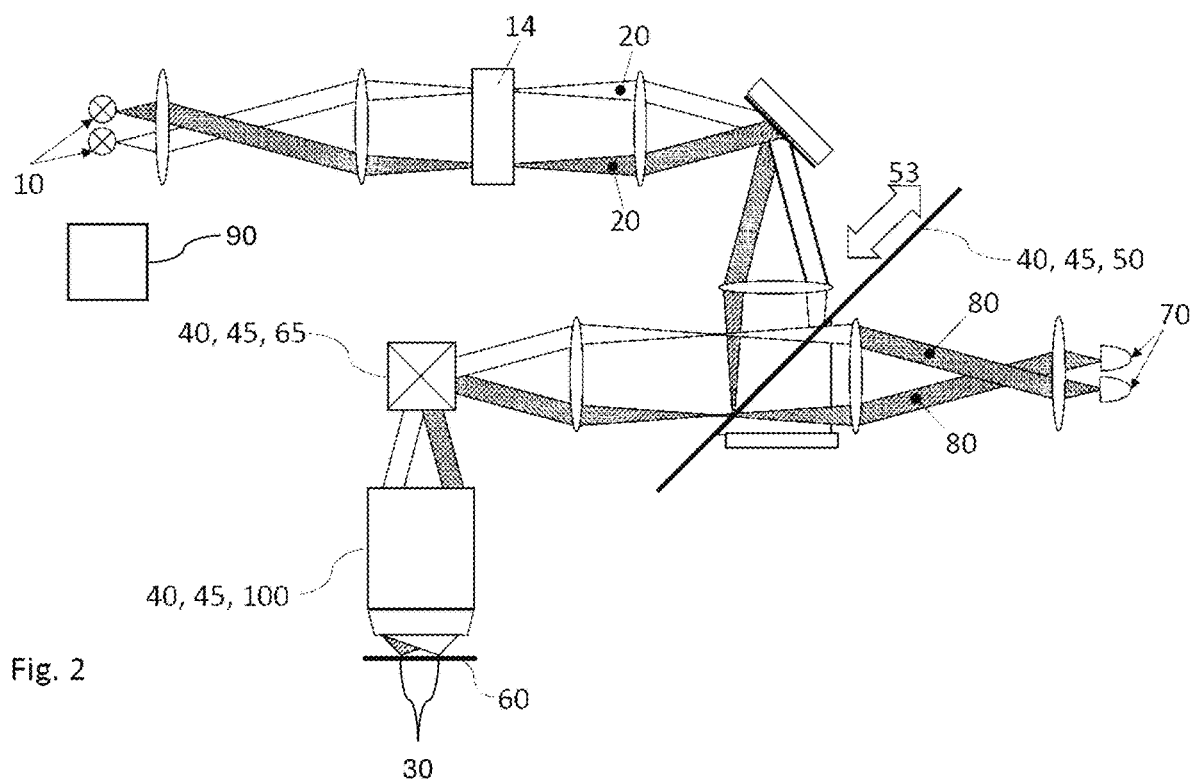
FIG. 2 shows an exemplary embodiment of a device according to the invention in a schematic illustration.

FIG. 2 illustrates an exemplary embodiment of a device according to the invention, using which proteins having excitation spectra close to one another can be excited simultaneously. It has a multicolor light source 10 having separating device (not shown) for providing two partial illumination beams 20, a filter device 14 for setting the spectral characteristic of the partial illumination beams 20, first optical means 40 for providing an illumination beam path for guiding and focusing each of the individual partial illumination beams 20 into a light spot 30 on or in a sample 60 to be examined. The filter device 14 is embodied, for example, as an AOTF.

In addition, a scanning unit 65 (as part of the first optical means 40) for guiding the light spot 30 over the sample 60 and a detection unit 70 for detecting detection light, which the sample 60 emits in partial detection beams 80 after irradiation by the individual partial illumination beams 20, are provided.

Furthermore, the device has second optical means 45 for providing a detection beam path for guiding the partial detection beams 80 onto the detection unit 70 and finally a control and evaluation unit (not shown) for activating the scanning unit 65 and for evaluating the detection light detected by the detection unit 70. The first optical means 40 and the second optical means 45 can partially have the same optical components, in particular a microscope objective 100. The scanning unit 65 can be, for example, a conventional x-y scanner. The light source 10 can be activated by the control and evaluation unit 90.

According to the invention, the first and second optical means 40, 45 share a beam splitter 50, which is segmented laterally to its surface normal into at least two filter fields 55 (see also FIG. 3 in this regard) to select wavelength ranges and/or polarization directions. At this beam splitter 50, the partial illumination beams 20 are reflected via the scanning unit 65 to the microscope objective 100, which focuses the partial illumination beams 20 in the sample 60. The scanning unit 65 scans the light spots 30 laterally over the sample 60. Fluorescent light excited in the focal points is collimated by the microscope objective 100 and guided in the direction of the scanning unit 65, which deflects the fluorescent light in a stationary manner in the direction of the detection unit 70. The fluorescent light is transmitted at the beam splitter 50. The beam splitter 50 is introduced here at a position of the beam path at which the partial illumination beams 20 are well separated from one another, i.e., close to the intermediate image. Moreover, the beam splitter 50 is arranged so it is displaceable, as illustrated by the arrow 53.

Figure 3:
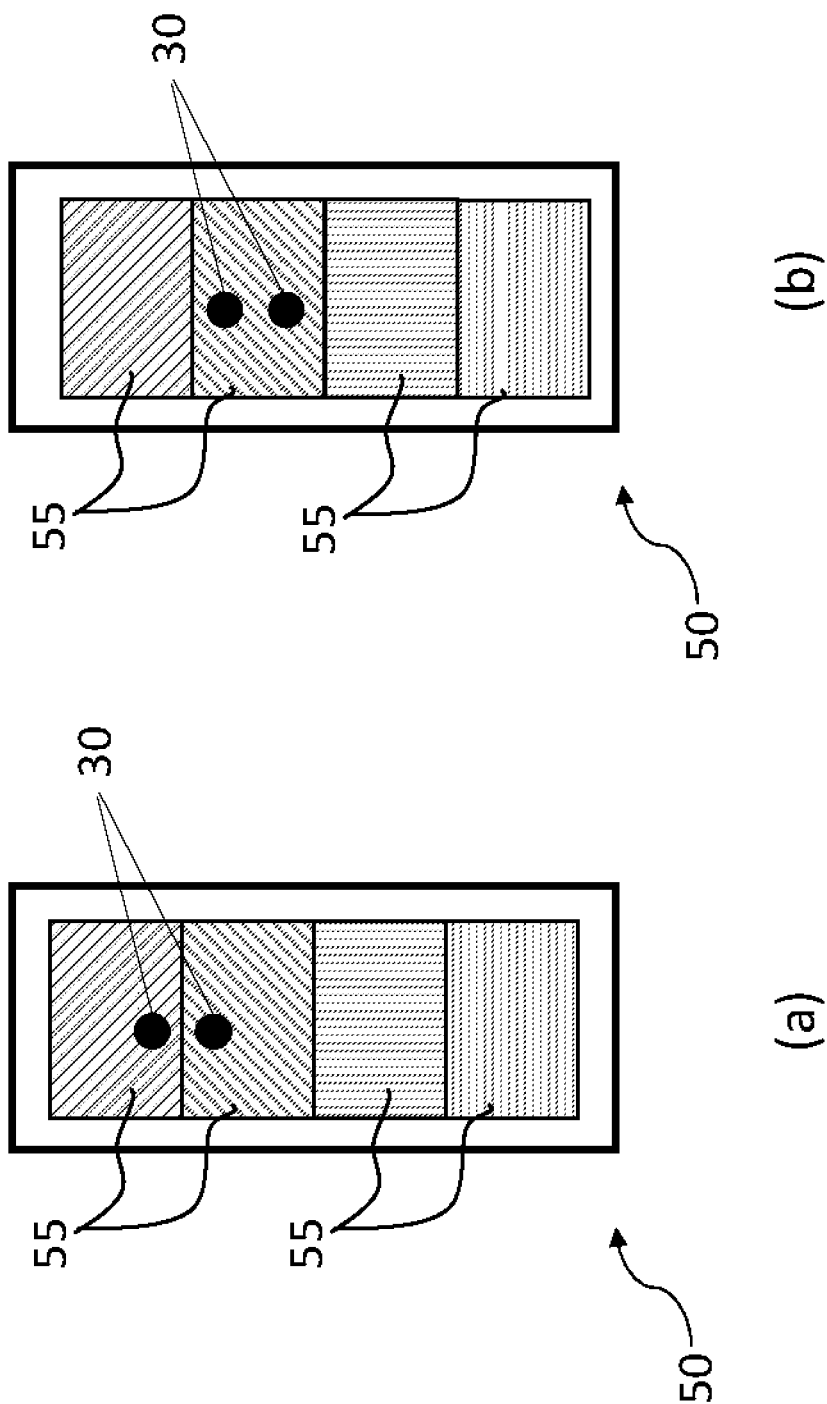
FIG. 3 shows a top view of a segmented beam splitter according to the invention in two operating configurations.

In the exemplary embodiment shown here, the beam splitter 50 is designed as a linear array of dielectric filter layer systems having high reflectivity in the vicinity of the selected excitation spectra and high transmission in the range of the fluorescence wavelengths, by which the four filter fields 55 are formed (cf. FIG. 3). Alternatively, it can be embodied as an AOBS. It is now possible by way of the displacement of the beam splitter 50 in the direction 53 indicated in FIG. 2 to provide different spectral reflectivities to the partial illumination beams 20. Therefore, for example, two wavelengths close to one another, such as 591 nm and 594 nm, which could not be delivered simultaneously on a sample using a single excitation point, may be divided onto two excitation spots or light spots 30 and thus the two corresponding pigments may be examined simultaneously.

As already indicated, a top view of the segmented beam splitter 50 is shown in FIG. 3. The segmented beam splitter 50 is shown in two operating configurations here. In FIG. 3a, the light spots 30 are located on different filter fields 55. The number of the excitable fluorophores for an image scan can thus be increased and/or the spectral difference, i.e., the difference of their wavelengths, of the illumination light beams 12 in relation to one another can be significantly reduced.

In FIG. 3b, both light spots 30 are located on the same filter field 55. Both light spots 30 can thus assume the same spectral characteristic, due to which the image data rate can be increased by reducing the image lines to be scanned or the signal-to-noise ratio can be increased by scanning the same sample region twice.

If more than only two spots are brought via the segmented beam splitter 50 onto the sample 60 either a synthesis from the configurations according to FIGS. 3a and 3b or the configuration according to FIG. 3b can be selected. Moreover, it can be advantageous for the combinatorics on excitable pigments that the same filter characteristic is provided multiple times on the beam splitter 50.

LIST OF REFERENCE NUMERALS 10 light source
14 filter device
20 partial illumination beam
30 light spot
40 first optical means
45 second optical means
50 beam splitter
55 filter field(s)
60 sample
65 scanning unit
70 detection unit
80 partial detection beams
90 control and evaluation unit

The invention claimed is:

1. A device for multi-spot scanning microscopy, the device comprising:
   a device for providing at least two partial illumination beams,
   a filter device for setting a spectral characteristic of the at least two partial illumination beams, first optical means for providing an illumination beam path for guiding and focusing each of the individual partial illumination beams in a light spot on or in a sample to be examined, a scanning unit for guiding the light spot over the sample, a detection unit for detecting detection light, which the sample emits in partial detection beams after irradiation using the individual partial light beams, second optical means for providing a detection beam path for guiding the partial detection beams onto the detection unit, a control and evaluation unit for activating the scanning unit and for evaluating the detection light detected by the detection unit, wherein, the first optical means and the second optical means have as shared components at least one beam splitter, which is segmented laterally to a surface normal of a color separator in at least two filter fields for selection of wavelength ranges, polarization directions, or a combination of wavelength ranges and polarization directions, and at least one of the filter fields is formed by means of a dielectric filter layer system.

2. The device as claimed in claim 1, wherein adjacent filter fields are formed to select wavelength ranges different from one another, polarization directions different from one another, or a combination of wavelength ranges different from one another and polarization directions different from one another.

3. The device as claimed in claim 1, wherein at least one of the filter fields is designed to select at least two wavelength ranges, at least two polarization directions, or a combination of at least two wavelength ranges and at least two polarization directions.

4. The device as claimed in claim 1, wherein the beam splitter for forming the at least two filter fields is formed as an acousto-optical beam splitter having at least two acousto-optical crystals separate from one another or having one acousto-optical crystal and at least two piezo crystals.

5. The device as claimed in claim 1, wherein the filter device is designed as a segmented acousto-optic tunable filter.

6. The device as claimed in claim 1, wherein at least one of the filter fields is designed as a neutral splitter.

7. The device as claimed in claim 1, wherein the at least one beam splitter is displaceable laterally to a surface normal of the at least one beam splitter.

8. The device as claimed in claim 7, wherein the control and evaluation unit is configured to activate a displacement of the at least one beam splitter.

9. The device as claimed in claim 1, wherein the at least one beam splitter is inclined at an angle to an optical axis of the beam path.

10. A method for multi-spot scanning microscopy using a device as claimed in claim 1, in which at least two partial illumination beams are provided using a device for providing partial illumination beams, the spectral characteristic of the at least two partial illumination beams is set using a filter device, the individual partial light beams are each guided in an illumination beam path into a light spot on or in a sample to be examined and scanned over it, detection light, which the sample emits in partial detection beams after irradiation using the individual partial illumination beams, is conducted onto a detection unit and detected thereby, wherein, the partial illumination beams, the detection beams, or a combination of the partial illumination beams and the detection beams are each selected by means of the beam splitter segmented laterally to a surface normal according to the wavelength ranges, the polarization directions, or a combination of the wavelength ranges and the polarization directions.

* * * * *